United States Patent [19]

Talcott

[11] Patent Number: 5,009,552
[45] Date of Patent: Apr. 23, 1991

[54] WEAR RESISTANT GRAIN FLOW CONTROL ELBOW

[76] Inventor: James G. Talcott, P. O. Box 2493, Great Falls, Mont. 59403

[21] Appl. No.: 493,492

[22] Filed: Mar. 12, 1990

[51] Int. Cl.⁵ ............................................. B65G 53/52
[52] U.S. Cl. .................................. 406/193; 285/179; 138/143
[58] Field of Search .................. 406/193, 195; 285/16, 285/179, 183; 138/37, 139, 140, 143; 193/2 R, 25 R

[56] References Cited

U.S. PATENT DOCUMENTS

| | | | |
|---|---|---|---|
| 3,833,267 | 9/1974 | McCumber | 406/193 |
| 4,479,743 | 10/1984 | Stahl | 406/193 |
| 4,621,953 | 11/1986 | McGuth | 406/193 |
| 4,641,864 | 2/1987 | Heine et al. | 406/193 |
| 4,645,055 | 2/1987 | Griese et al. | 193/2 R |

FOREIGN PATENT DOCUMENTS 823003 9/1969 Canada ................. 406/193
581068 7/1933 Fed. Rep. of Germany ...... 406/193

*Primary Examiner*—Sherman Basinger
*Assistant Examiner*—Stephen P. Avila
*Attorney, Agent, or Firm*—Richard C. Conover

[57] ABSTRACT

The present invention includes structure for redirecting the stream flow of a high velocity flow of particulate material. A chamber is mounted between an entrance spout and a discharge spout through which a stream of particulate matter flows. The chamber includes a baffle apparatus which is positioned in the stream flow within the chamber. The baffle apparatus includes two members formed in a "V" shaped pattern with the apex of the "V" positioned closer to the discharge spout than the free ends of the "V". The apex of the "V" is broken away to permit particulate matter to slide from the baffle to the discharge spout when flow into the chamber stops. The baffle is positioned so that the incoming matter strikes the baffle. Particulate matter is collected by the baffle so that further incoming matter strikes the particulate matter instead of the baffle.

2 Claims, 3 Drawing Sheets

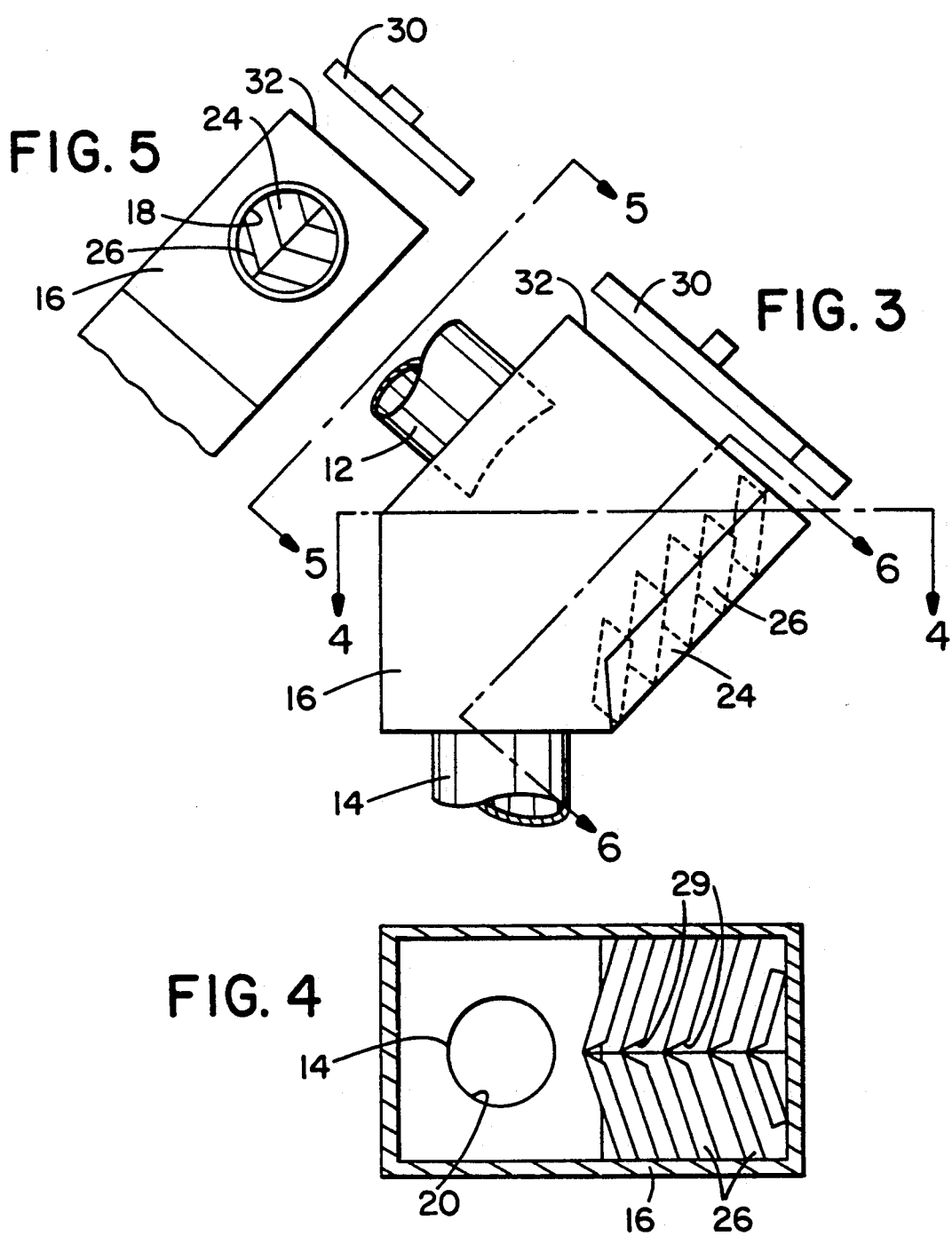

WEAR RESISTANT GRAIN FLOW CONTROL ELBOW

BACKGROUND OF THE INVENTION

This invention relates to an improved wear resistant grain flow control elbow.

When particulate matter such as corn, wheat, barley or the like is delivered to a grain elevator or is directed from the grain elevator to a truck or railroad car, for example, the stream flow of the particulate being transported must often times be redirected through an elbow to the place where the particulate matter is to be deposited. Even though these elbows are made of steel or similar material, the particulate matter, which flows at high velocity through the elbow, acts as an extremely abrasive material as it strikes an inner surface of the elbow. The abrasion caused by the particulate material leads to a rapid deterioration of the inner surface, impacted by the particulate material, which requires frequent repair or replacement.

Wear plates are typically mounted on the appropriate inner wall surfaces to protect conduits from the abrasive nature of the particulate matter such as shown in U.S. Pat. No. 3,110,521 to Rogers et al. and U.S. Pat. No. 4,645,055 to Griese et al.

Another technique which has been used incorporates baffles which are positioned in the stream flow when the particulate matter is caused to flow in a different direction. In devices using this technique, the baffles collect the particulate material during stream flow which act as a shield to restrict wear of the inner surface. A device incorporating this technique is shown in U.S. Pat. No. 4,479,743 to Stahl. Such baffles typically collect particulate matter which remains trapped in the baffles when the stream flow to the baffles has stopped. If there is a long delay between successive uses of the devices, any trapped grain may contaminate successive uses. Trapped grain may also attract rodents or insects into the device after a grain flow stops.

Thus, it would be desirable to provide a wear resistant grain flow control elbow through which particulate material flows which overcomes the problems of previous devices. It would be desirable to provide a device which does not need to be replaced at frequent intervals, and is self-cleaning so that particulate matter is not trapped after a grain flow has stopped. Further, it would be desirable to provide an elbow which would reduce the velocity of particulate matter being transported to downstream spouting equipment, and at the same time provide a structure to shield the elbow from abrasive wear. Further, it would be desirable to have a wear resistant elbow which is easily adaptable to various uses and inexpensive to manufacture and maintain.

SUMMARY OF INVENTION

The present invention relates to an improved wear resistant grain flow control elbow for use in redirecting and slowing the stream flow of a high velocity flow of particulate material.

The present invention includes a chamber which is mounted between an entrance spout and a discharge spout through which a stream of particulate matter flows. This stream flow is redirected from the direction of stream flow through the entrance spout to the direction of stream flow through the discharge spout.

This chamber includes a first opening which is positioned in fluid communication with the entrance spout and includes a second opening in fluid communication with the discharge spout. The entrance spout is positioned above the discharge spout and is further positioned with the direction of stream flow through the entrance spout at an angle greater than 90° from the direction of stream flow through the discharge spout. A baffle-support plate is provided within the chamber. The baffle-support plate is positioned to provide an inclined surface extending from one side of the second opening upwardly and generally perpendicular to the stream flow through the entrance spout. Baffles are secured to the baffle-support plate with each baffle extending upwardly from the baffle plate and sized to provide clearance between the top of the baffle and an opposing wall of the chamber.

Each baffle further includes two members formed in a "V"-shaped pattern with the apex of the "V" positioned closer to the second opening than the free ends of the "V". The apex of the "V" is broken away in each baffle to permit particulate matter to slide from the baffle to the discharge spout after flow into the chamber stops.

With this arrangement, the incoming particulate matter continually fills the baffles and begins to flow over the baffles toward the discharge spout. Incoming matter strikes the particulate matter held by the baffles, thus providing a wear-resistant shield which prevents the high velocity particulate flow from striking the surface of the baffle-support plate. Once the stream flow has stopped, the particulate matter remaining in the baffles continues to flow out of the baffles into the discharge spout, thus self-cleaning the flow control elbow.

BRIEF DESCRIPTION OF THE DRAWINGS

In order that the invention may be clearly understood and readily carried into effect, preferred embodiments of the invention will now be described, by way of example only, with reference to the accompanying drawings wherein:

FIG. 3 is a side exploded view of the grain flow control elbow shown in FIG. 1;

FIG. 4 is a cross-sectional view taken along the line 4—4 in FIG. 3;

FIG. 5 is an oblique view as seen along the line 5—5 in FIG. 3;

DESCRIPTION OF PREFERRED EMBODIMENT

Figure 1:
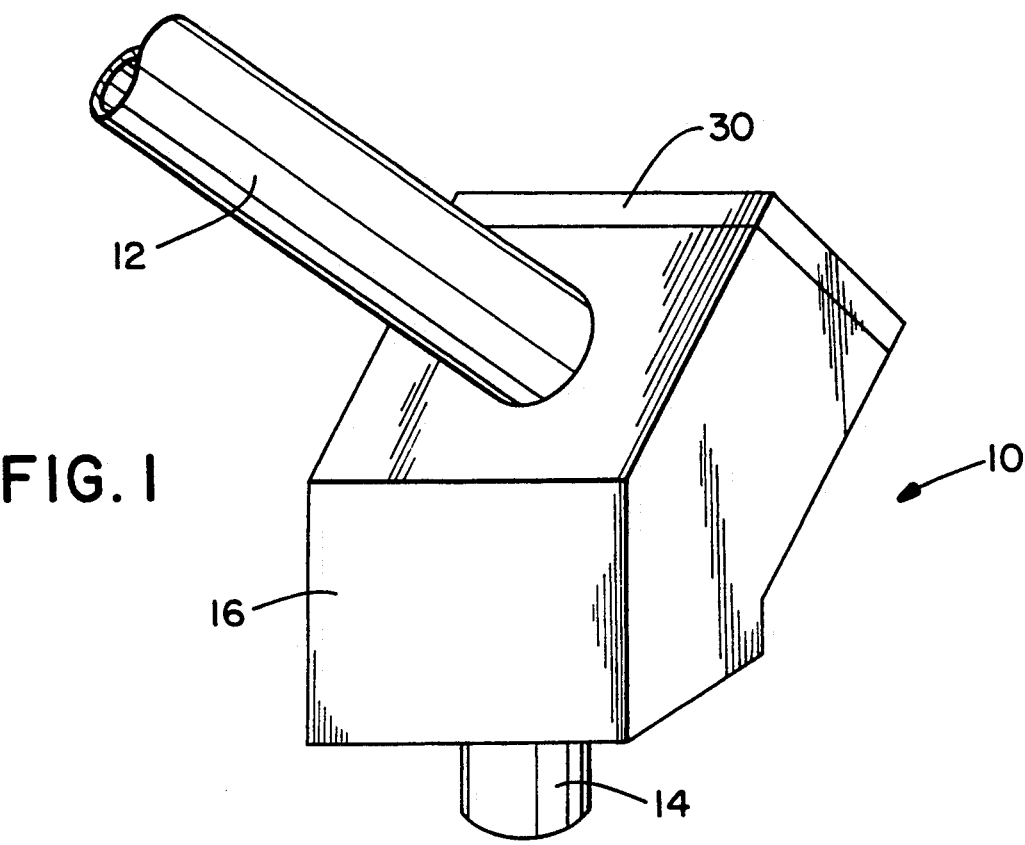
FIG. 1 is a perspective view from the right front of a wear resistant grain flow control elbow according to the present invention.
Figure 2:
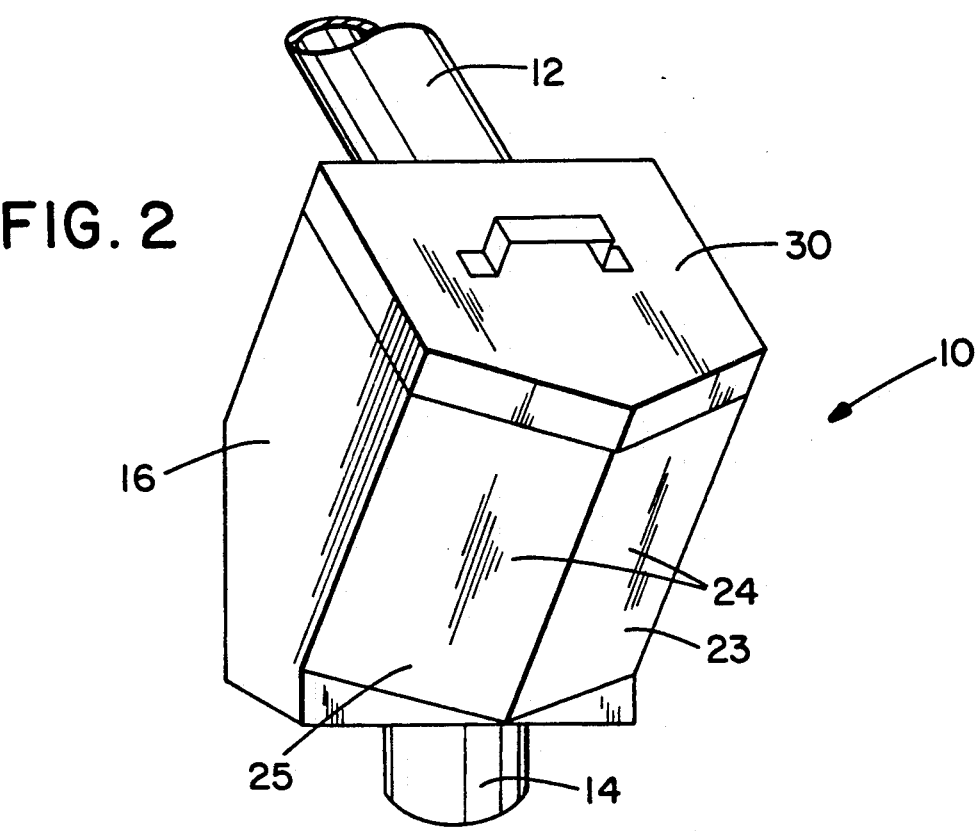
FIG. 2 is a perspective view from the left rear of the grain flow control elbow shown in FIG. 1.
Figure 7:
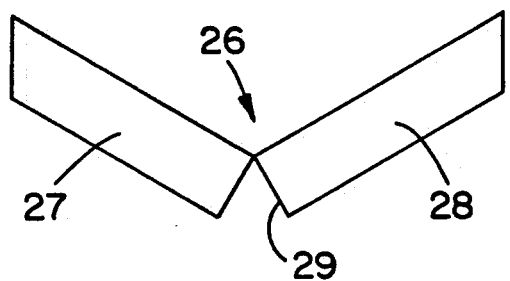
FIG. 7 is a front view of a baffle used with the present invention.

A perspective view of a wear resistant grain flow control elbow 10 is shown in FIGS. 1 and 2. Particulate matter flows into the flow control elbow 10 through entrance spout 12 and leaves the flow control elbow 10 through discharge spout 14.

Figure 6:
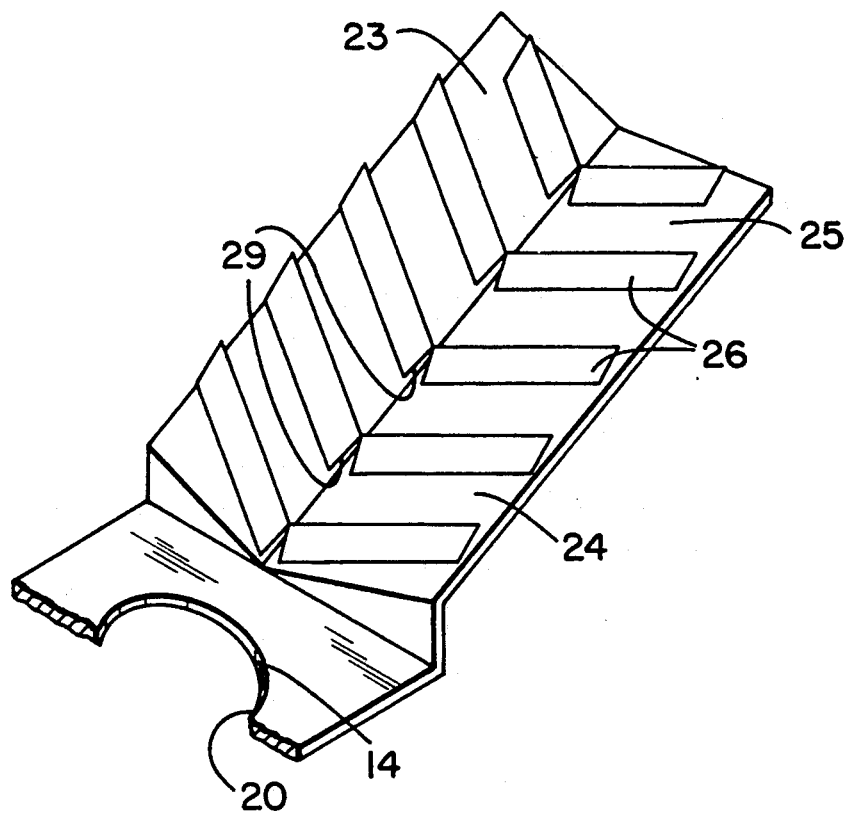
FIG. 6 is a top perspective view of the baffles used with the present invention taken along the line 6—6 in FIG. 3 with the chamber walls broken away.

The elbow 10 includes a chamber 16 having a first opening 18 in fluid communication with the entrance spout 12 and a second opening 20 in fluid communication with the discharge spout 14. The chamber 16 provides a path for particulate matter to travel from the entrance spout 12 to the discharge spout 14. The discharge spout 14 is located below the first opening 18 so that particulate matter can exit the chamber under the influence of gravity. Further, the entrance spout is positioned so that the direction of stream flow through the entrance spout is at an angle of 90° or greater with respect to the direction of stream flow through the discharge spout. A baffle-support plate 24 is positioned within the chamber in the path of the particulate matter flowing through the chamber. The baffle-support plate 24 is positioned to provide an inclined surface extending from one side of the second opening 20 upwardly and generally perpendicular to the stream flow through the entrance spout 12. In a preferred embodiment, the baffle-support plate 24 includes plates 23 and 25 joined together along a common edge to form a "V"-shaped trough as best seen in FIGS. 2 and 6. Alternatively, a single flat plate could be used as the baffle-support plate 24 in place of the two joined plates 23 and 25. On the side of baffle-support plate 24 facing entrance spout 12, upstanding baffles 26 are secured to the baffle-support plate 24. Baffles 26 are sized to provide clearance between the top of baffles 26 and the opposing wall of chamber 16.

Each baffle 26 includes two members 27 and 28 positioned in a "V"-shaped pattern on the baffle-support plate 24 as best seen in FIG. 6 with the apex of the "V"-shaped baffle positioned closer the second opening 20 than the free ends of the "V"-shaped baffle. In addition, the apex of each "V"-shaped baffle 26 is broken away to provide an opening 29. Particulate matter sliding down baffles 26 flows through opening 29 toward the discharge spout 14. The opening 29 is sized to slow the flow of particulate matter through the chamber 16 so that as particulate matter enters the chamber 16 some of the particulate matter is trapped behind baffles 26.

During flow of particulate matter into the chamber 16, the particulate matter first fills the volume behind baffles 26 so that further flow of particulate matter into the chamber strikes the particulate matter trapped by the baffles which prevents abrasion of the inner surface of the chamber walls 16. When the flow of particulate matter through the entrance spout has stopped, any particulate matter remaining in the baffles slides away through the opening 29 to the discharge spout 14.

A cover 30 is placed over an entry port 32, which cover 30 can be removed for access to the interior of chamber 16.

In operation, entrance spout 12, which may be a particulate matter conduit, is inserted in the first opening 18 of chamber 16. Whenever flow of particulate matter is started, the particulate matter enters chamber 16 through the entrance spout 12 and is directed toward baffle-support plate 24 which is oriented generally perpendicular to the stream flow and has baffles 26 oriented toward the stream flow. Some particulate matter is retained above baffles 26 to act as a shield against abrasion of the baffle-support plate 24. Most of the particulate matter is deflected by this grain shield toward the discharge spout 14. The small amount of particulate matter continually slipping through opening 29 is constantly replenished with incoming particulate matter from the stream flow. Whenever the stream flow ceases, any particulate matter remaining in the baffles continues to slide toward the discharge spout 14 through the openings 29 until the grain remaining behind the baffles is exhausted.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A flow control elbow for changing direction of particulate matter flowing in a stream, the flow control elbow comprising:

an entrance spout through which the stream of particulate matter may flow;

a discharge spout through which the stream of particulate matter may flow;

a chamber having a first opening in fluid communication with the entrance spout and a second opening in fluid communication with the discharge spout; the chamber further providing a path for the particulate matter to travel from the entrance spout to the discharge spout;

the entrance spout being positioned above the discharge spout and being further positioned with the direction of stream flow through the entrance spout at an angle 90° or greater with the direction of stream flow through the discharge spout;

a baffle-support plate provided within the chamber in the path of the particulate matter through the chamber, the baffle-support plate being positioned to provide an inclined surface extending from one side of the second opening upwardly and generally perpendicular to the stream flow through the entrance spout;

a baffle secured to the baffle-support plate, the baffle extending upwardly from the baffle plate and sized to provide clearance between the top of the baffle and an opposing wall of the chamber;

the baffle including two members formed in a "V"-shaped pattern with the apex of the "V"-shaped pattern positioned closer the second opening than the free ends of the "V"-shaped pattern;

the baffle further having the apex broken away to permit grain flow from above the baffle to the discharge spout.

2. The flow control elbow according to claim 1 wherein the baffle-support plate is composed of two members being inclined with respect to one another and joined along a common edge to form a trough.

* * * * *